US010620697B2

(12) United States Patent
Veeramani et al.

(10) Patent No.: US 10,620,697 B2
(45) Date of Patent: Apr. 14, 2020

(54) WIRELESS COMMUNICATION MANAGEMENT FOR VIRTUAL REALITY DEVICES (71) Applicant: Intel Corporation, Santa Clara, CA (US)

(72) Inventors: Karthik Veeramani, Hillsboro, OR (US); Ofer Hareuveni, Haifa (IL); Vijay Sarathi Kesavan, Portland, OR (US); Rajneesh Chowdhury, Portland, OR (US); Gabriel Arrobo Vidal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/144,110

(22) Filed: Sep. 27, 2018

(65) Prior Publication Data

US 2019/0041976 A1    Feb. 7, 2019

(51) Int. Cl.
*G06F 3/01* (2006.01)
*G02B 27/01* (2006.01)
*G06T 19/00* (2011.01)
*H04W 28/16* (2009.01)

(52) U.S. Cl.
CPC ............ *G06F 3/011* (2013.01); *G02B 27/017* (2013.01); *G06F 3/012* (2013.01); *G06T 19/006* (2013.01); *H04W 28/16* (2013.01)

(58) Field of Classification Search
CPC ........ G06F 3/011; G06F 3/012; H04W 28/16; G02B 27/017; G06T 19/006
See application file for complete search history.

(56) References Cited

U.S. PATENT DOCUMENTS

2019/0243599 A1* 8/2019 Rochford ............... G06F 3/1454

* cited by examiner

*Primary Examiner* — Hashim S Bhatti
(74) *Attorney, Agent, or Firm* — Schwabe, Williamson & Wyatt, P.C.

(57) ABSTRACT

Wireless communication management methods and apparatuses for use with a virtual reality system are disclosed. A virtual reality subsystem, access point, and virtual reality devices are configured to interact with the access point to ensure that appropriate bandwidth is allocated and latency times are guaranteed between the virtual reality devices and a virtual reality application running on a host computer. The access point is configured with a virtual reality traffic handler to receive policies from the virtual reality subsystem, to ensure sufficient bandwidth and latency.

25 Claims, 6 Drawing Sheets

WIRELESS COMMUNICATION MANAGEMENT FOR VIRTUAL REALITY DEVICES

TECHNICAL FIELD

Embodiments described herein generally relate to virtual reality and wireless infrastructure. More particularly, disclosed embodiments are directed to managing wireless network communications to support multiple virtual reality devices.

BACKGROUND

Virtual reality (VR) offers an immersive experience for a variety of applications. A typical VR system includes a headset or head-mounted display (HMD), and, optionally, one or more sensors (such as wearable sensors) to capture user actions as inputs. Gaming is an increasingly popular use of VR technology, with relatively inexpensive headsets available from a number of different providers, such as HTC, Oculus, and Sony, encouraging the development of a variety of VR-enhanced games. The advent of inexpensive headsets is also helping fuel a more widespread adoption of the technology. Some games support multiple players, for a shared VR experience.

DESCRIPTION OF EMBODIMENTS

VR equipment may include the aforementioned HMDs, as well as devices (such as wearable sensors) for capturing a user's motion for interaction with a VR application, such as a game. Devices may also include hand-held controllers, scanners, and so forth. Some HMDs may include integrated sensors to capture the user's head motions, to allow the user to look around a virtual environment. The various pieces of equipment may connect to a computer or console, which is responsible for executing the application, receiving inputs from the devices, and providing a video feed to the headset.

VR applications can impose relatively high requirements on networking components used to connect an HMD and sensors to a system running a VR application. High definition VR can require simultaneous transmission of two high definition (HD) video streams, one for each eye and each with a slightly different perspective to provide 3D. Transmitting two HD streams requires significant bandwidth, the requirements of which may be heightened as the frame rate of the delivered video streams increases. High frame rates, in excess of 60 fps, and in some implementations exceeding 90 fps, can provide a more responsive and realistic VR experience. Sensors providing interaction and control with the VR application, in contrast, tend to have low bandwidth requirements, but may need a relatively low latency connection to provide a realistic, nearly instantaneous response to user inputs.

While wireless communications protocols support increasingly greater bandwidth to allow for simultaneous transmission of multiple HD video streams, latency can still pose an issue, particularly when a given wireless communications system is utilized by multiple devices that are communicating simultaneously. High latency can hamper the VR experience, by imposing a delay between when a user performs an action or moves, and the video stream in the HMD reflects the action or move. This delay can result from high latency in either direction; from a delay in delivery of the HD video stream frames reflecting the action or move, from a delay in delivery of action or motion data from sensors to the VR application, or both. Thus, for a consistent, high-quality VR experience, the communications components between a HMD and sensors, and the VR application, should provide consistent low latency response.

Dedicated wired connections provide one possible solution, as they offer each connected device with its own link and, potentially, dedicated bandwidth. However, wireless communications are increasingly preferred. In the case of VR, where a user may make physical movements to interact with the VR environment, cables and wires may present hazards with entanglement, or dislodgment of equipment. Moreover, VR applications such as games may offer a multi-player aspect, where several users, each with their own HMD and sensors, connect to a single game and interact together. Each additional player increases bandwidth requirements and network overhead, increasing the risk of lag due to high latency, as discussed above.

Wireless communications, such as by the forthcoming 802.11ax standard, can offer sufficiently high bandwidth to support multiple VR users through a single wireless access point. With respect to latency, wireless access points have offered quality of service (QoS) functionality starting with the 802.11e standard. QoS systems vary in their approach to providing traffic prioritization, but generally employ one or more queues that can be allocated to a specific type of traffic, e.g. video, audio, application-specific, etc. A variety of different algorithms may be employed to determine how to service the various queues to achieve a target quality of service as may be offered by a particular queue. However, these existing approaches to providing QoS may not be able to guarantee the low latency levels required for an optimal VR experience, particularly where multiple VR devices are in simultaneous use on a given wireless network.

The embodiments disclosed herein address these deficiencies, including provision of an end-to-end wireless management solution. An access point can be influenced to group one or more VR devices wirelessly connected to the access point into a multi-user (MU) group. A computer serving the VR devices can also be included in the MU group. The computer further includes a VR subsystem (VRS), according to embodiments, that provides interfaces for managing the MU groups and resource unit (RU) allocation in the access point. Each VR device, which may be an HMD, also includes an interface for exchanging data with the VRS and for routing or tagging traffic from the VR device to be directed to the proper MU group in the access point as may be established via the VRS, according to the embodiments.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
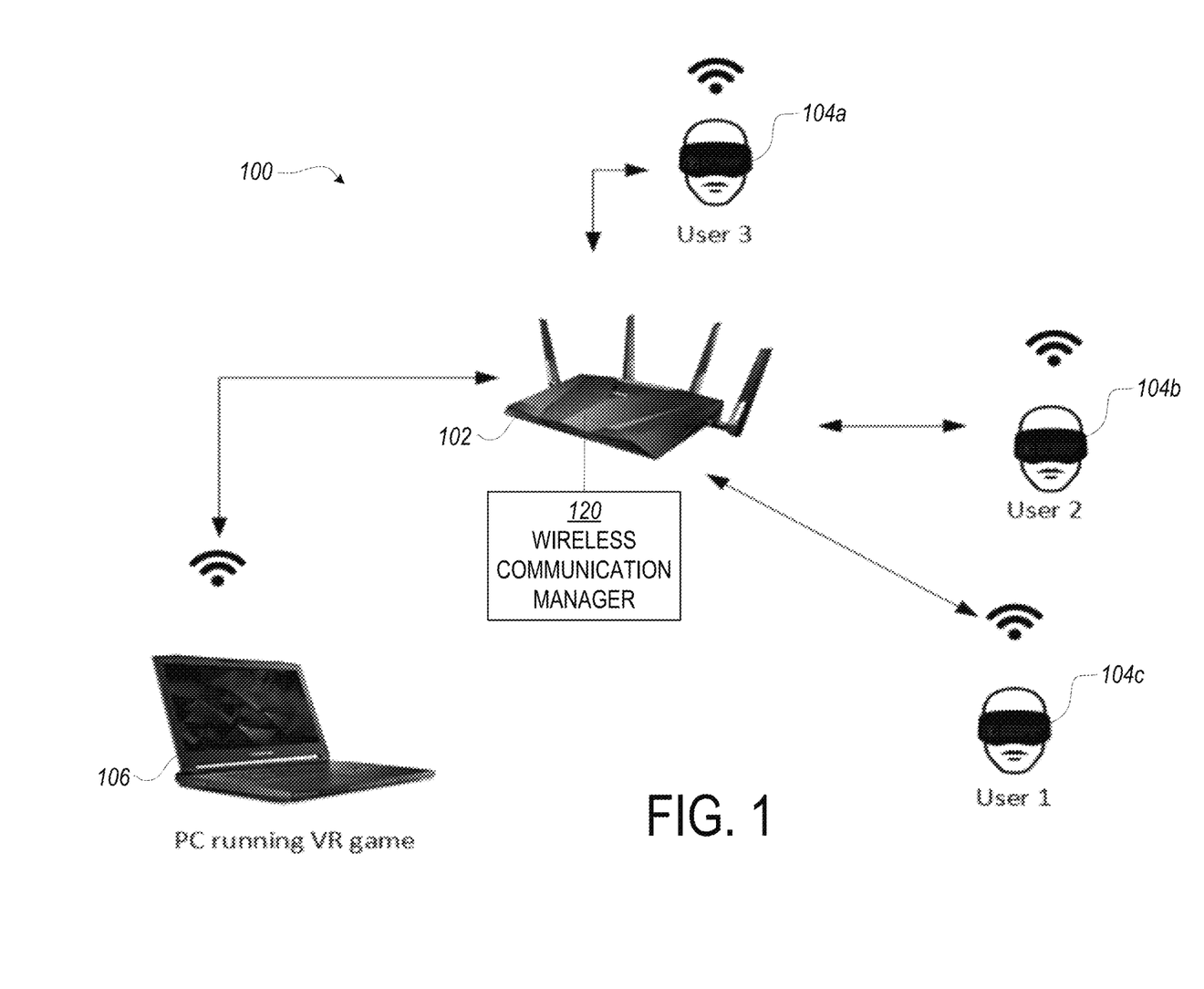
FIG. 1 depicts the various components of a multi-user VR system incorporated with the teachings of the present disclosure, according to some embodiments.

In FIG. 1, the components of an example multi-user virtual reality (VR) system 100 incorporated with the teachings of the present disclosure are depicted. System 100 includes a wireless access point 102, which facilitates and coordinates communications between a plurality of VR devices 104a, 104b, and 104c, and a host computing device 106, depicted here as a laptop computer. The VR devices connect to the wireless access point 102 via a wireless communication link. Likewise, host computing device 106 may connect to access point 102 via a wireless communication link, as depicted. Access point 102 includes wireless communication manager 120 arranged to manage the flow of data from computer 106, such as video and audio, to VR devices 104a-104c, and data from VR devices 104a-104c, such as position and motion information of a user of a VR device, to host computing device 106, for interacting with the software. In accordance with the present disclosure, wireless communication manager 120 includes features that allow it to manage wireless communication between at least one virtual reality (VR) input or output (I/O) device, such as VR devices 104a-104c, and a host computing device 106 via wireless networking, the host computing device 106 having a virtual reality subsystem (VRS), described further herein, to influence the wireless communication manager 120. These and other aspects will be described more fully below.

In other embodiments, host computing device 106 may be hardwired to access point 102, such as via an Ethernet connection. In still other embodiments, access point 102 may be integrated with host computing device 106, with connections to various VR devices 104a-104c being made via a point to point or ad hoc wireless connection. Although three VR devices are depicted, this is merely for example. Any number of VR devices may be in communication with wireless access point 102. Furthermore, VR devices 104a-104c and host computing device 106 may not be the only devices in communication with access point 102. Some examples may include other devices such as tablets, smartphones, laptops, printers, scanners, or any other peripherals capable of wireless or wired communication with access point 102. VR devices 104a-104c exchange data with host computing device 106, which may run software configured to output information to VR devices 104a-104c.

Figure 2:
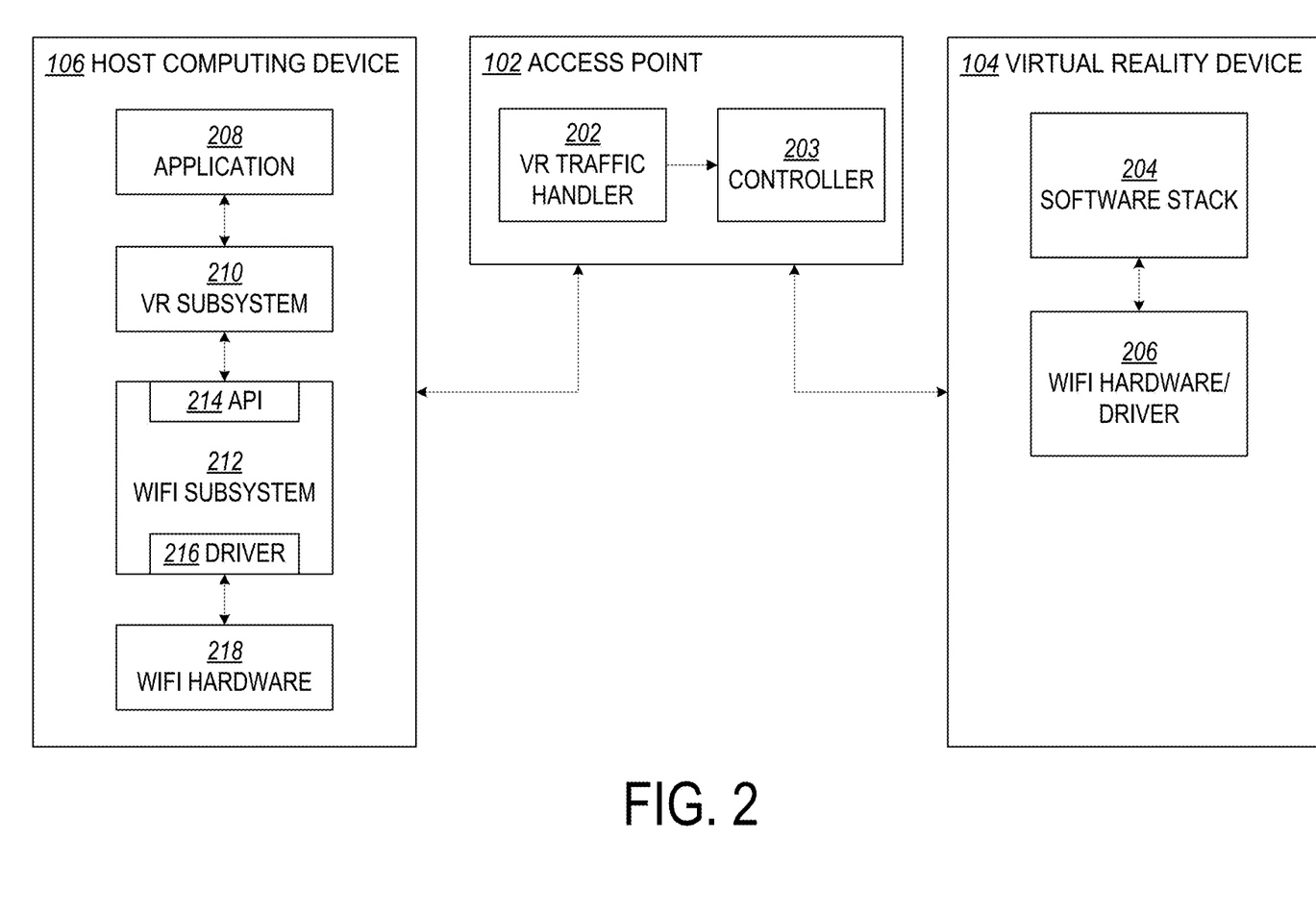
FIG. 2 is a block diagram of example hardware and software components involved with connecting a HMD with a computer through a wireless access point, according to some embodiments.

FIG. 2 depicts block diagrams of example components and connections of the elements of FIG. 1, according to embodiments. Access point 102 includes a VR traffic handler 202 and controller 203 for managing the various connections to access point 102. Together, VR traffic handler 202 and controller 203 may correspond to wireless communication manager 120 of FIG. 1. VR device 104 includes a software stack 204 and a WiFi hardware and driver 206. Host computing device 106 includes an application 208, a VR subsystem 210, a WiFi subsystem 212 that includes an application programming interface (API) 214, and driver 216, and WiFi hardware 218. Depending on the requirements of a given implementation, embodiments may omit one or more of these components, or have additional components that are not shown.

Figure 5:
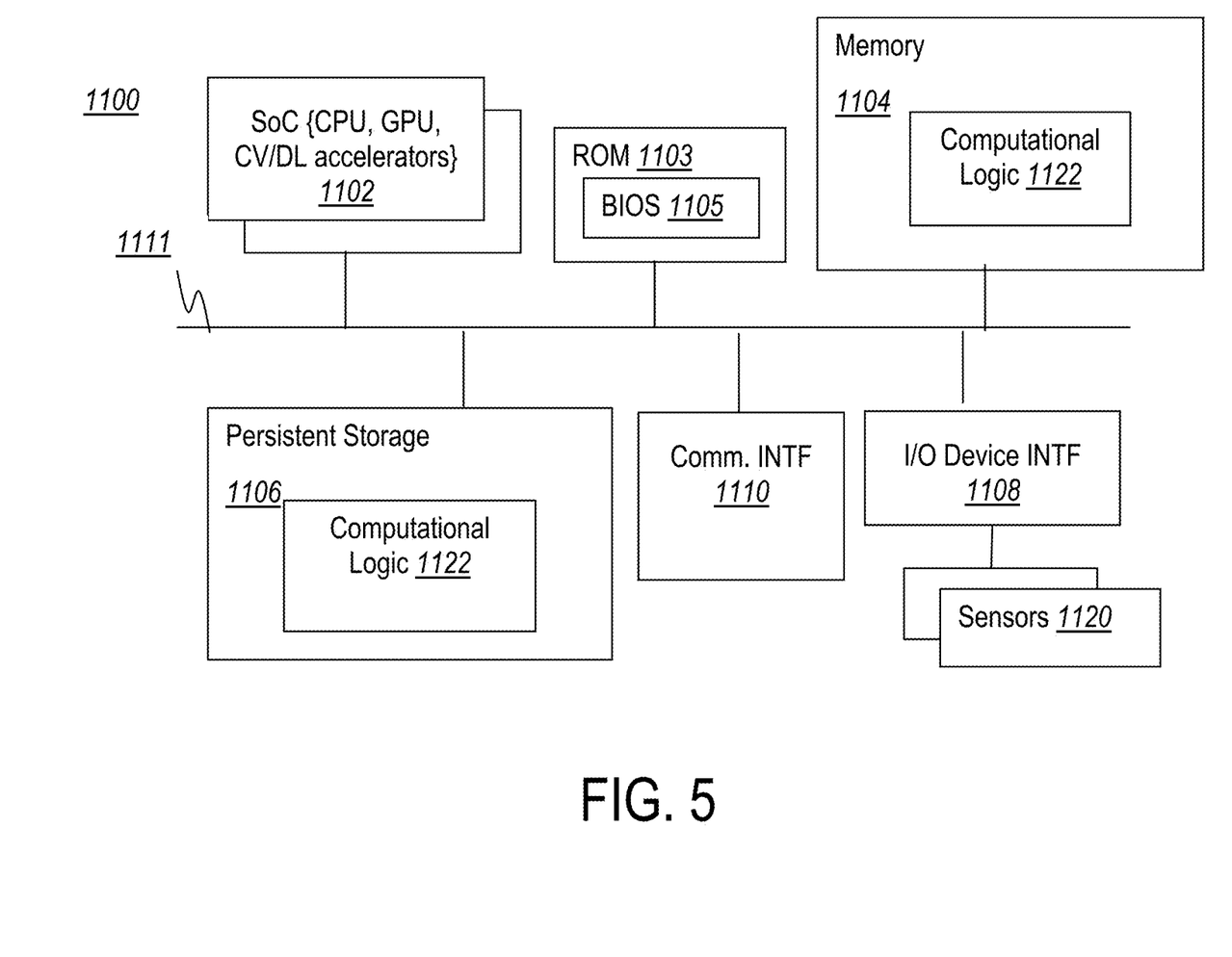
FIG. 5 illustrates a hardware component view of the system suitable for practicing the present disclosure, according to various embodiments.

Host computing device 106 may be implemented as a computing platform 1100 of FIG. 5, such as a laptop, desktop or server system. The specific requirements for host computing device 106 may depend upon the specific requirements of the VR application 208 intended to be run on computing device 106, as well as the number of VR devices 104 intended to connect to host computing device 106 and interact with the VR application 208. As will be understood, as the number of connected VR devices 104 increases, the requirements of host computing device 106 may accordingly increase for a given VR application 208, due to the potentially greater number of different frames that must be rendered simultaneously to provide to each VR device 104. Host computing device 106 may be an off-the-shelf or commercially available systems, such as a laptop, desktop, or server available from a manufacturer such as Dell, Hewlett-Packard, Lenovo, Apple, or a similar manufacturer. Host computing device 106 may further run any commercially available operating systems, including Microsoft Windows, Apple macOS, and Linux. Other embodiments may use a custom-developed host computing device 106 that is hardware optimized for VR application 208, and/or a custom-developed operating system that is likewise optimized for VR application 208.

VR application 208 may be any software configured to support and provide graphical output to VR device 104. Example applications 208 can include video games, 3D modeling software, data access systems, visualization software, media consumption software, such as for viewing 3D movies, or any other graphically-oriented software that may benefit from interfacing with a VR device 104. As it typically includes the various algorithms and assets necessary to create the graphical environment to be presented to VR device 104, VR application 208 is responsible for generation of the frames to be displayed on VR device 104. The generated frames may be determined by VR application 208 on the basis of sensor information and feedback from VR device 104, such as when application 208 presents an interactive VR environment.

VR application 208 may include algorithms for generating a 3D or interactive VR environment, and, depending on the specific implementation, may dispatch information about the environment to a graphical subsystem for actual rendering of each frame, such as one or more graphics processing units (GPUs), or may be directly responsible for rendering the frames. VR application 208, as shown in the embodiment depicted in FIG. 2, interfaces with VR subsystem (VRS) 210. In various embodiments, VR application 208 receives the sensor information and feedback from VR device 104 passed through VRS 210, and supplies VRS 210 with frames to be displayed for each connected VR device 104, such as by passing a frame buffer with the frames, or directing VRS 210 to obtain the frames from a GPU.

VRS 210, in the disclosed embodiments, controls the VR pipeline and provides an abstraction layer and interface to VR application 208, so that VR application 208 need not be aware of the specifics and variations of hardware in the VR pipeline. VRS 210 receives frames generated by (or caused to be generated by) VR application 208, and determines how they are to be dispatched to one or more VR devices 104 in communication with VRS 210, via WiFi subsystem 212 and WiFi hardware 218. Depending upon the specifics of a given embodiment of system 100, VRS 210 may designate frames as destined for a specific VR device 104 (as will be described below, a VR device 104 that includes a display, rather than a VR device 104 only configured to detect motion, such as a hand grip), and pass such designation to WiFi subsystem 212, to ensure that a given user of a VR device 104 receives the correct frames that correspond to the user's particular view being provided by VR application 208, and does not receive frames specific to a different user's view.

As VRS 210 controls the VR pipeline and handles data to and from each VR device 104, VRS 210 may be specific to a given type or model of VR device 104, e.g. HTC Vive, Oculus Rift, etc. Other embodiments may implement VRS 210 in several modules or logical blocks, with a high level block for controlling the VR pipeline and one or more lower level blocks for communications that are specific to a particular type of VR device 104, not unlike a device driver. For example, VRS 210 may include several different lower level blocks to provide support for multiple different types of VR devices 104, e.g. a block for HTC vive, and a second block for an Oculus Rift. Regardless of implementation (e.g. only supporting a single type or model of VR device 104, or multiple types of VR devices 104), VRS 210 may be implemented as a single, monolithic code module, or as multiple modules, depending upon the requirements of a given implementation or embodiment. In some embodiments, VRS 210 may be part of a larger, monolithic software stack that may include WiFi subsystem 212 and/or VR application 208, where VRS 210 is essentially a logical division.

Still further, VRS 210 may be implemented as software, such as on a computer-readable medium, as a dedicated hardware system, or a combination of both. VRS 210 may, in some embodiments, be a part of an operating system running upon host computing device 106, may be a dedicated hardware portion or module inserted into host computing device 106, or a combination of the foregoing. As discussed above, where VRS 210 is at least partially implemented as software, VRS 210 may be implemented using objects or modules, as a monolithic structure, or a hybrid of the two approaches.

VRS 210, in the disclosed embodiments, interacts with WiFi subsystem 210, which may be via an API 214. WiFi subsystem 212, in turn, may communicate with VR traffic handler 202 in access point 102 to manage the wireless communications sessions between host computing device 106, access point 102, and VR device 104, such management undertaken in coordination with and per instructions received from VRS 210. The instructions may be received from VRS 210 via API 214. As will be understood from FIG. 2, such communications may be via a driver 216, which in turn interacts with WiFi hardware 218, the hardware 218 responsible for actual medium control and transmission, e.g. managing wireless radios where the connection is via a WiFi or other wireless link, or managing transmission over a cable, e.g. twisted pair, coaxial, or other suitable technology, where the connection is hard-wired.

Such management of wireless communications sessions, in embodiments, includes sending policies established by VRS 210 and supplied to WiFi subsystem 210 via API 214 to the VR traffic handler 202 to influence it ensure that access point 102 accordingly creates multi-user groups and allocates sufficient resources, such as bandwidth, queue(s), and resource units to provide acceptably low latency and bandwidth to users of system 100. Interactions with VR traffic handler 202 are passed to WiFi hardware 218 via the WiFi driver 216 that is typically part of the operating system on host computing device 106. Via this connection, WiFi subsystem 212, as part of managing the wireless connections with one or more VR devices 102 and in response to requests from VRS 210 via API 214, can transmit unsolicited buffer status reports (BSRs). The BSRs may be sent in a Quality of Service (QoS) field or BSR control field, in embodiments. This places data between VRS 210 and VR device(s) 104 at a higher precedence over potentially competing traffic from other devices, apart from system 100, that may be in communication with access point 102. VRS 210 may also transmit bandwidth query reports (BQRs), to assist access point 102 in determining available bandwidth, such as between access point 102 and each VR device 104. In coordination with VRS 210 (in embodiments via API 214, as discussed above), WiFi subsystem 212 may tag information with a traffic ID (TID), used to map to a differentiated services code point (DSCP), to request appropriate QoS, uplink resource units and/or latency guarantees.

Still further, VRS 210 may configure or instruct VR traffic handler 202, via WiFi subsystem 210, to influence access point 102 to place one or more VR devices 104 into at least one multi-user (MU) group. The MU group may be associated with the aforementioned policies, so that devices within the MU group are guaranteed sufficient allocation of resource units, bandwidth, and acceptably low latency. WiFi subsystem 210 may influence a QoS preferred access category transmitted by access point 102 in a MU uplink trigger frame via BSR manipulation, as described above.

Whether a given latency is acceptably low may depend upon the particular implementation of system 100 and its associated components, and the requirements of VR application 208. In some implementations, a threshold may be established for latency, below which latency is deemed acceptable. If latency increases above the established threshold, VRS 210 may revise policies and instructions to VR traffic handler 202 to secure additional resources, such as additional resource units, queues, bandwidth allocation, and any other resources provided by access point 102.

VRS 210 may instruct access point 102 (via WiFi subsystem 210 and VR traffic handler 202, as explained above) to place all VR devices 104 and host computing device 106 into a single MU group, in some embodiments. In other embodiments, VRS 210 may instruct for two MU groups, one for traffic outbound from host computing device 106 to VR devices 104, and one for traffic inbound from VR devices 104 to host computing device 106. Still other embodiments may employ additional MU groups, such as a MU group for downlink traffic from access point 102 to one or more VR devices 104, another MU group for uplink traffic from one or more VR devices 104 to access point 102, another MU group for downlink traffic from access point 102 to host computing device 106, and still another MU group for uplink traffic from host computing device 106 to access point 102. VRS 210 may also instruct access point 102 to configure host computing device 106 and access point 102 for a single user transmission, while access point 102 and VR devices 104 may be in one or more MU groups, as described above. Combinations of the foregoing may also be employed, e.g. two MU groups for uplink and downlink traffic between the access point 102 and VR devices 104, and a single MU group for host computing device 106 and access point 102; other permutations may be possible in keeping with the disclosed embodiments. The selection of MU group configurations, including whether to employ a particular MU group or single user (SU) transmissions, may be selected based upon anticipated traffic.

VRS 210, in embodiments, may use MU groups (or SU transmissions, in some implementations) to employ frame aggregation to optimize bandwidth usage (and, by extension, help to minimize latency). Various wireless protocols that may be implemented by access point 102, e.g. 802.11ax, support a form of multicasting, where packets or frames may be transmitted in singular from host computing device 106 to access point 102, which then effectively supplies the packet(s) or frame(s) to each connected VR device 104, e.g. it may broadcast the single aggregated frame or packet to all VR devices 104 that are in a MU group. Some embodiments may employ aggregated MAC service data units (A-MSDUs) to provide such aggregation. Given the relatively large packet/payload size of transmitting video frames from host computing device 106 to the various VR devices 104, frame aggregation can optimize bandwidth and latency for transmitted video streams.

VRS 210 may employ target wake time (TWT) negotiations with access point 102, related to an MU group or groups, to help coordinate when various devices connected to access point 102 are scheduled to exchange data. In such a fashion, VRS 210 can influence access point 102 to effectively schedule, in time, bandwidth usage between VR devices 104 and other connected devices. With such scheduling, time slots in bandwidth (which can be defined by resource units) may be left relatively clear, thereby helping ensure that VR devices 104 have sufficient bandwidth and acceptably low latency.

Figure 3:
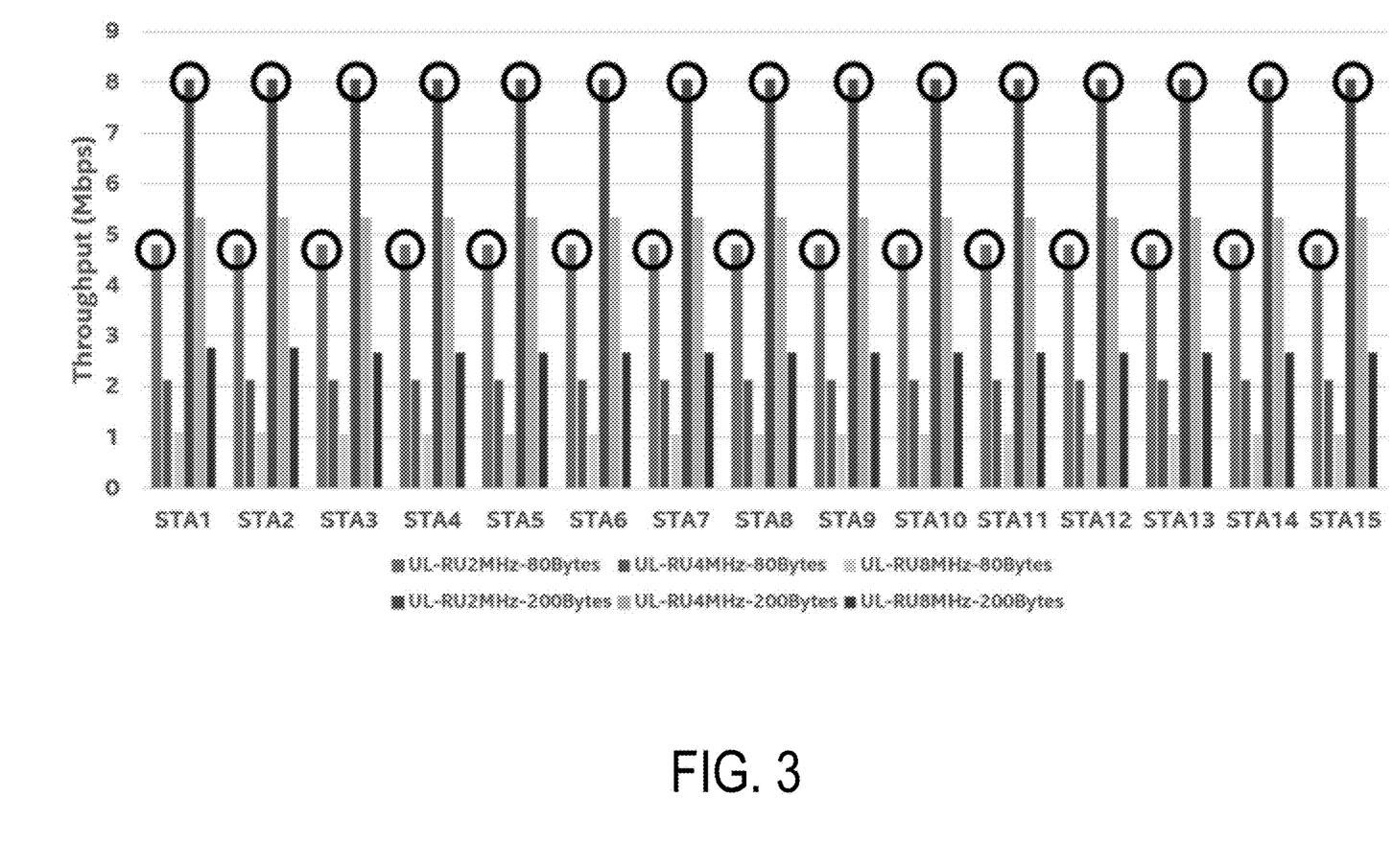
FIG. 3 is a chart demonstrating the impact of resource unit packet size and channel bandwidth on data throughput, according to some embodiments.

VRS 210 can further influence access point 210, via VR traffic handler 202, with information from host computing device 106. Data from sensors on VR devices 104 (e.g. inertial measurement units, as will be described in more detail herein) can be measured for average transmission time between a VR device 104 and host computing device 106, as well as packet size. Sensor data from VR devices 104 may, in embodiments, be comprised of a series of short packets generated several hundred to several thousand times per second. By informing and influencing access point 210 of the packet nature, access point 210 can allocate its resources accordingly, that is, low bandwidth, e.g. 2 MHz resource units, for relatively small packet sizes, e.g., equal to or less than 200 bytes, which can optimize throughput, and by extension, latency. Such a scheme is depicted in FIG. 3, where the uplink throughput in M bps for a group of stations STA1-STA15, each in communication with access point 102, is graphically depicted. The throughput bars for each STA1-15, listed from left to right, include 2 MHz resource unit (RU) with an 80 byte payload, 4 MHz RU with 80 byte payload, 8 MHz with 80 byte payload, 2 MHz RU with 200 byte payload, 4 MHz RU with 200 byte payload, and 8 MHz with 200 byte payload. As can be seen, packet sizes of 200 bytes with 2 MHz bands provide the most optimal throughput, with 2 MHz RUs offering optimal throughput for either payload size.

In embodiments, WiFi subsystem 212, and more specifically driver(s) 216, are in communication with WiFi hardware 218 of host computing device 106. As depicted in FIG. 2, WiFi subsystem 212 may include an application programming interface (API) 214, which presents a VR subsystem abstraction for VRS 210, and one or more drivers 216, as discussed above. WiFi hardware 218 may be any wireless communications hardware that is configured to talk to access point 102, such as WiFi 802.11ax standard adapters. Although the term "WiFi" is used, this is but one possible implementation; any suitable wireless communication technology that support the management techniques described in this disclosure may be employed. WiFi subsystem 212, through its interaction with WiFi hardware 218 and the associated driver(s), can obtain the IP/MAC addresses of the various VR devices 104 that are in communication with access point 102 to help facilitate requesting and establishing MU groups. WiFi subsystem 212 may pass this information to VRS 210 to assist in its management tasks. VRS 210 may also be able to obtain via WiFi subsystem 212 QoS, channel, and bandwidth information to determine whether VRS 210 needs to adjust policies to the VR traffic handler 202 for MU groups, to help ensure adequate bandwidth and latency.

Access point 102, as described above, includes a controller 203 for managing wireless communications between the various devices in wireless connection with access point 102, according to embodiments. Controller 203, in various embodiments, is influenced by VR traffic handler 202 to establish and maintain MU groups, determine bandwidth and channel allocations, and allocate resource units. Resource units comprise a subcarrier allocation of bandwidth, which may be time based, depending upon the multiplexing scheme access point 102 may implement. Resource units may vary in size depending upon the bandwidth of the allocated subcarrier. Typically, 2 MHz is the smallest subcarrier allocation for a resource unit, with larger allocations being possible, especially where larger packets need to be transmitted. Thus, controller 203 is responsible for allocating bandwidth to VR devices 104 and/or host computing device 106, among any other devices connected to access point 102. Where VR devices 104 are configured in MU groups, resource unit (and thus, bandwidth allocations and queues) may be allocated by controller 203.

As discussed above, VR traffic handler 202 communicates with VRS 210 via WiFi hardware 218 and WiFi subsystem 212, and receives various messages, such as unsolicited BSRs and BQRs, setting policies from VRS 210. VR traffic handler 202, in communication with controller 203, then influences controller 203 per the policies set by VRS 210 to ensure that the components of system 100 have needed bandwidth, resource unit allocations and target latency.

Controller 203 acts on these policies; it should be understood that any actions taken on the policies may be impacted by existing policies established in access point 102. Thus, VR traffic handler 202 acts as the communications point with VRS 210 to secure the necessary wireless communications performance for system 100.

In embodiments, access point 102 is implemented as a WiFi access point that supports the 802.11ax protocol, and so may support connections with any 802.11ax compatible device, as well as legacy devices that use older 802.11 protocols/amendments. It will be understood that legacy devices may not support all functionality described herein, such as MU groups, which may require 802.11ax specific functionality. Access point 102 may comprise a computing platform 1100 running a dedicated or embedded operating system in some embodiments. VR traffic handler 202 and/or controller 203 may be implemented as software modules or components of the embedded operating system. In other embodiments, either or both of VR traffic handler 202 and controller 203 may be implemented in whole or in part in hardware, such as with processing circuitry, dedicated circuitry, ASICs, FPGAs, or other suitable technology. Access point 102 may include one or more memory or storage modules, which may, among other components, be used by VR traffic handler 202 and/or controller 203 in controlling and/or managing traffic, such as for establishing queues, buffering traffic, caches, and/or other functions. Access point 102 may employ multiple radios and implement beamforming, in some embodiments. Access point 102 may further incorporate or be in communication with a wide area network adapter, such as a coaxial interface for connecting to a cable-based internet connection, e.g. a cable modem configured to a DOCSIS standard, to an optical connection, to a dedicated point to point internet connection, to a hybrid fiber-coaxial network, or any other suitable communications technology for communicating across a wide area network or the Internet.

VR device 104, in embodiments, includes a software stack 204, which is in communication with WiFi hardware and driver 206. VR device 104 also may include various sensors that comprise an inertial measurement unit (IMU), such as gyroscopes and accelerometers. Such sensors may be implemented using MEMS or other suitable technologies. The IMU may provide sensor data to feed back to VR application 208 to interact with the application. VR device 104 may be implemented as a head-mounted display (HMD), which incorporates IMU sensors as well as at least one display for presenting video frames generated by VR application 208 to a user of VR device 104. In other embodiments, VR device 104 may include a handheld or similar controller, separate from a display, for a user to provide input to VR application 208. Examples of such embodiments may include gloves, wands, or similar handheld controllers that sense hand movements. Other such embodiments may include spatial scanners configured to scan a fixed area and measure a user's body movements and other motions. System 100 may use one or a combination of these various VR devices 104. The selection of VR devices 104 may depend upon the specific implementation of system 100, as well as the requirements VR application 208.

Software stack 204 of VR device 104, in embodiments, includes any software modules necessary to enable the functionality of VR device 104, such as a display driver (where VR device 104 is a HMD, for example), sensor drivers appropriate to the various sensors, and communication modules. Software stack 204 may also include any APIs or other interfaces for communication with VRS 210, as part of the VR pipeline. VRS 210 may act to configure VR device 104 in any ways required by VR application 208.

WiFi hardware and driver 206 include, in embodiments, any radios and supporting hardware necessary to allow VR device 104 to wirelessly communicate with access point 102. The driver portion may alternative be incorporated into software stack 204. WiFi hardware and driver 206 may be configured to interact with VRS 210 to provide any necessary data such as an IP or MAC address, which can enable VR device 104 to be placed into an MU group as discussed above.

Figure 4:
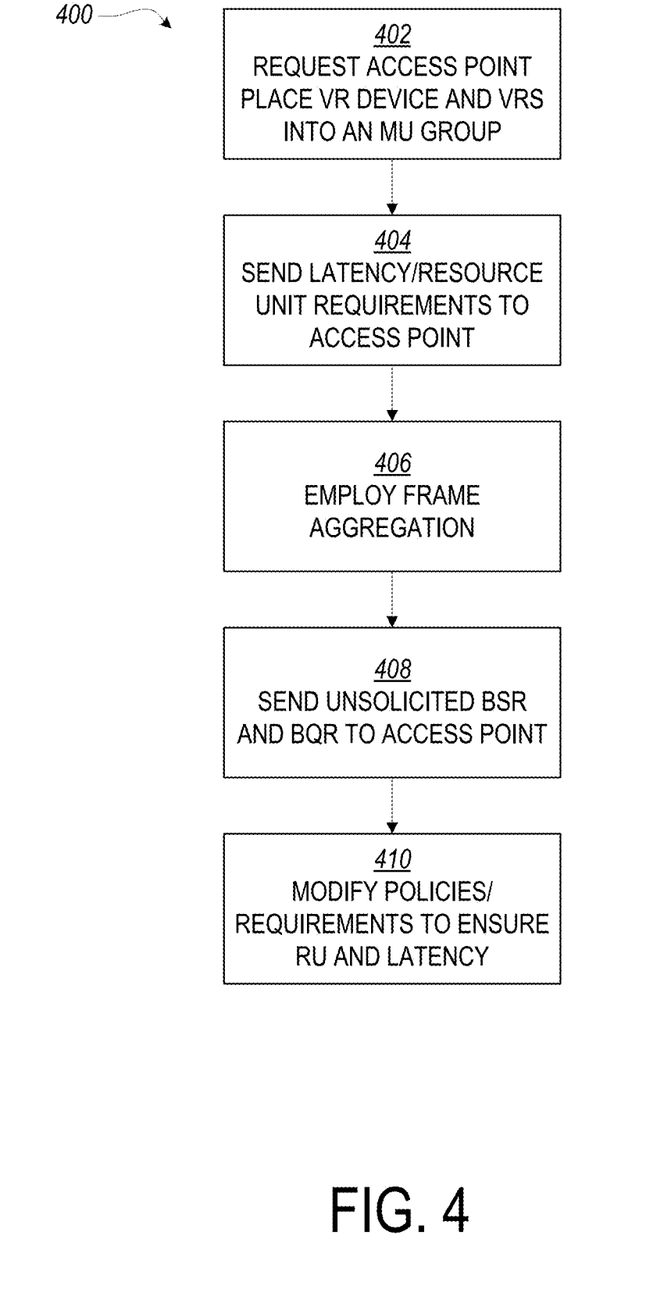
FIG. 4 is a flowchart of a method for wireless communication management for virtual reality devices, to be performed in whole or in part by the hardware and software components depicted in FIG. 2, according to various embodiments.

Turning to FIG. 4, a method 400 that may be performed in whole or in part by various components of system 100, in various embodiments, as described above with reference to FIGS. 1 and 2, is disclosed. The details of the following operations have been discussed above, and will not be repeated here; the reader is directed to the discussion of FIG. 2, and in particular of VRS 210.

In operation 402, VRS 210 requests that access point 210, via WiFi subsystem 212 in communication with VR traffic handler 202, place one or more VR devices 104 and VRS 210 into a multi-user group. VRS 210 next sends latency and resource unit requirements to access point 102 in the form of a policy or policies providing the requirements of system 100, per operation 404.

Once MU groups are established and policies are in place with VR traffic handler 202, in operation 406 VRS 210 may employ frame aggregation, in particular with frame data sent from host computing device 106 to the VR devices 104 in MU groups, and may likewise request small RUs, with 2 MHz bandwidth in some embodiments, for sensor data from VR devices 104 to host computing device 106.

In operation 408, VRS 210 may request that WiFi subsystem 212 send unsolicited BSRs and BQRs to access point 102, and include a high TID as described above, to enable access point 102 to ensure traffic to and from MU groups and associated VR devices 104 are given higher priority and lower latency than other devices that may be in communication with access point 102.

Finally, in operation 410, VRS 210 may modify policies and bandwidth/latency requirements, and convey the same to VR traffic handler 202 to ensure that access point 102 continues to allocate sufficient RUs to MU group and VR devices 104.

Referring now to FIG. 5, an example computing platform that may be suitable for use to practice the present disclosure, according to various embodiments, is illustrated. As shown, computing platform 1100, which may be access point 102, VR device 104, and/or host computing device 106, may include one or more system-on-chips (SoCs) 1102, ROM 1103 and system memory 1104. Each SoC 1102 may comprise or include one or more processor cores (CPUs), one or more graphics processor units (GPUs), and/or one or more accelerators, such as computer vision (CV) and/or deep learning (DL) accelerators. Although denoted as a SoC, SoC 1102 may, in some embodiments, comprise a discrete processor such as a CPU, GPU, or accelerator, which may be coupled to any supporting hardware, such as one or more memory and/or I/O controllers, and/or other supporting circuitry. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120, which may include sensors in VR device 104, including sensors in a HMD as well as associated hand-held devices. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/NR 5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with method 400, as well as any firmware or logic implementing functions of access point 102, VR device 104, and/or host computing device 106,. The various elements may be implemented by assembler instructions supported by processor core(s) of SoCs 1102 or high-level languages, such as, for example, C, that can be compiled into such instructions.

Figure 6:
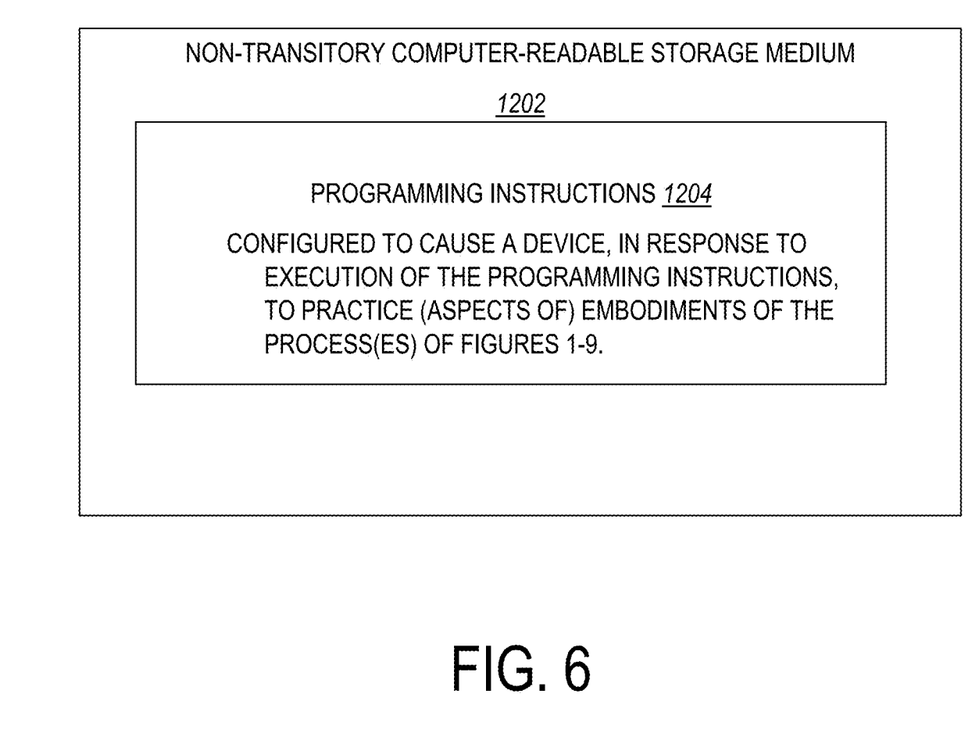
FIG. 6 illustrates a storage medium having instructions for practicing methods described with reference to FIGS. 1-4, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) access point 102, VR device 104, and/or host computing device 106, as well as some or all operations of method 400. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

The following examples pertain to further embodiments.

Example 1 is a wireless access point, comprising processing circuitry comprising a controller to manage wireless communication between devices of a wireless network via the wireless access point; a virtual reality (VR) traffic handler to influence the controller in its management of wireless communication between at least one virtual reality (VR) input or output (I/O) device, and a computing device of a wireless networking, the computing device having a virtual reality subsystem (VRS); wherein to influence the controller includes to influence the controller in provisioning a multi-user group for the at least one VR I/O device and the VRS, and manage the at least one VR I/O device and the VRS to wirelessly communicate, via the wireless access point, as affiliated members of the multi-user group, based at least in part on requests for multi-user group affiliation, and policies for latency and resource unit requirements for sensor data from the at least one VR I/O device received from the VRS.

Example 2 includes the subject matter of example 1, or some other example herein, wherein the controller manages wireless communication between the devices of the wireless network via the wireless access point, in accordance with 802.11ax.

Example 3 include the subject matter of example 1 or 2, or some other example herein, wherein a resource unit has a bandwidth of approximately 2 MHz.

Example 4 includes the subject matter of any of examples 1-3, or some other example herein, wherein sensor data from the at least one HMD is identified to the VRS by a traffic ID (TID).

Example 5 includes the subject matter of any of examples 1-4, or some other example herein, wherein the VR traffic handler is further to receive feedback from the VRS about resource unit requirements for the sensor data from the at least one VR I/O device on a continuous basis.

Example 6 includes the subject matter of any of examples 1-5, or some other example herein, wherein the VR traffic handler is to influence the controller to prioritize non-scheduled access of sensor data from the at least one VR I/O device and video data from the VRS to the at least one VR I/O device.

Example 7 includes the subject matter of any of examples 1-6, or some other example herein, wherein the at least one VR I/O device is a head mount device (HMD).

Example 8 is a non-transitory computer-readable medium (CRM) comprising instructions for a virtual reality subsystem (VRS) that, when the instructions are executed by a processor of a computing device, cause the computing device to implement the VRS to request a wireless access point to place the one or more head-mounted displays (HMDs) into at least one multi-user group, wherein the wireless access point manages wireless communication between devices of a wireless network, and wherein the devices include the computing device and the one or more HMDs; send policies to the wireless access point for latency and resource unit requirements for sensor data from the one or more HMDs; and utilize frame aggregation to aggregate packets to be sent to one or more HMDs via the wireless access point.

Example 9 includes the subject matter of example 8, or some other example herein, wherein the instructions are further to cause the VRS to instruct a WiFi subsystem to send unsolicited buffer status reports to the wireless access point to influence the wireless access point in managing wireless communication between the VRS and the one or more HMDs.

Example 10 includes the subject matter of example 8 or 9, or some other example herein, wherein the wireless access point is influenced to cause wireless communication between the VRS and the one or more HMDs to have a higher precedence over traffic from other devices in communication with the wireless access point.

Example 11 includes the subject matter of any of examples 8-10, or some other example herein, wherein the instructions are further to cause the VRS to instruct the WiFi subsystem to include a traffic identifier, to influence provisioning of required resources by the wireless access point.

Example 12 includes the subject matter of any of examples 8-11, or some other example herein, wherein the instructions are to cause the VRS to send the policies and instruct the WiFi subsystem to send the unsolicited buffer status reports to a virtual reality (VR) traffic handler in the wireless access point, for the VR traffic handler to influence a controller of the wireless access point in managing the wireless communication between the VRS and the one or more HMDs.

Example 13 includes the subject matter of any of examples 8-12, or some other example herein, wherein the instructions are to further cause the VRS to instruct the WiFi subsystem to send to the wireless access point a bandwidth query report.

Example 14 includes the subject matter of any of examples 8-13, or some other example herein, wherein the VRS communicates with the wireless access point through a WiFi driver of the computing device.

Example 15 includes the subject matter of any of examples 8-14, or some other example herein, wherein the instructions are to further cause the VRS to use target wake time negotiations, to cause WiFi stations in communication with the wireless access point to operate at different times to minimize contention with resources required by the one or more HMDs.

Example 16 is a method, comprising requesting a wireless access point in communication with a virtual reality subsystem (VRS) and at least one virtual reality (VR) input or output (I/O) device to place the VRS and the at least one VR I/O device into at least one multi-user group, wherein the wireless access point manages wireless communication between devices of a wireless network, and wherein the devices include a computing device hosting the VRS and the at least one VR I/O device; sending, by the VRS, policies to the wireless access point for latency and resource unit requirements for sensor data from the at least one VR I/O device; and utilizing frame aggregation to aggregate packets to be sent from the VRS to the at least one VR I/O device in communication with the wireless access point.

Example 17 includes the subject matter of example 16, or some other example herein, further comprising requesting, by the VRS, that a WiFi subsystem send unsolicited buffer status reports to the wireless access point, the buffer status reports to have a higher precedence over traffic from other stations in communication with the wireless access point.

Example 18 includes the subject matter of example 16 or 17, or some other example herein, wherein the at least one multi-user group is a first multi-user group for carrying uplink traffic from the at least one VR I/O device to the access point, and is comprised of the VR I/O device and the wireless access point, and the method further comprises requesting the wireless access point place the at least one VR I/O device and into a second multi-user group for downlink traffic from the access point to the at least one VR I/O device, place the computing device hosting the VRS and the wireless access point into a third multi-user group for uplink traffic from the computing device to the wireless access point, and place the wireless access point and the computing device into a fourth multi-user group for downlink traffic from the wireless access point to the computing device.

Example 19 includes the subject matter of any of examples 16-18, or some other example herein, further comprising sending, by a WiFi subsystem, a bandwidth query report to the wireless access point.

Example 20 includes the subject matter of any of examples 16-19, or some other example herein, further comprising using target wake time negotiations to cause stations in communication with the wireless access point to operate at different times to minimize contention with resources required by the at least one VR I/O device.

Example 21 includes the subject matter of any of examples 16-20, or some other example herein, further comprising using a traffic ID to give the packets to be sent from the VRS to the at least one VR I/O device a higher priority over other traffic to the wireless access point.

Example 22 is a system, comprising virtual reality (VR) control means; VR traffic handling means; memory means to buffer traffic for the VR traffic handling means; and at least one VR sensing means, wherein the VR control means is to request the VR traffic handling means to place the at least one VR sensing means and the VR control means into a multi-user group, and request the VR traffic handling means to allocate uplink resource units and latency guarantees for sensor data from the at least one VR sensing means.

Example 23 includes the subject matter of example 22, or some other example herein, wherein the VR control means is to send unsolicited buffer status reports to the VR traffic handling means to influence the VR traffic handling means in managing wireless communication between the VR control means and the at least one VR sensing means.

Example 24 includes the subject matter of example 23, or some other example herein, wherein the unsolicited buffer status reports are to have a higher precedence over traffic from other devices in communication with the VR traffic handling means.

Example 25 includes the subject matter of any of examples 22-24, or some other example herein, wherein the VR control means is to further include a traffic identifier, to influence provisioning of required resources by the VR traffic handling means.

What is claimed is:
1. A wireless access point, comprising:
  processing circuitry comprising a controller to manage wireless communication between devices of a wireless network via the wireless access point;
  a virtual reality (VR) traffic handler to influence the controller in its management of wireless communication between at least one virtual reality (VR) input or output (I/O) device, and a computing device of a wireless networking, the computing device having a virtual reality subsystem (VRS);
  wherein to influence the controller includes to influence the controller in provisioning a multi-user group for the at least one VR I/O device and the VRS, and manage the at least one VR I/O device and the VRS to wirelessly communicate, via the wireless access point, as affiliated members of the multi-user group, based at least in part on requests for multi-user group affiliation, and policies for latency and resource unit requirements for sensor data from the at least one VR I/O device received from the VRS.

2. The wireless access point of claim 1, wherein the controller manages wireless communication between the devices of the wireless network via the wireless access point, in accordance with 802.11ax.

3. The wireless access point of claim 1, wherein a resource unit has a bandwidth of approximately 2 MHz.

4. The wireless access point of claim 1, wherein the VR traffic handler is further to receive feedback from the VRS about resource unit requirements for the sensor data from the at least one VR I/O device on a continuous basis.

5. The wireless access point of claim 1, wherein the VR traffic handler is to influence the controller to prioritize non-scheduled access of sensor data from the at least one VR I/O device and video data from the VRS to the at least one VR I/O device.

6. The wireless access point of claim 1, wherein the at least one VR I/O device is a head mount device (HMD).

7. A non-transitory computer-readable medium (CRM) comprising instructions for a virtual reality subsystem (VRS) that, when the instructions are executed by a processor of a computing device, cause the computing device to implement the VRS to:
request a wireless access point to place one or more head-mounted displays (HMDs) into at least one multi-user group, wherein the wireless access point manages wireless communication between devices of a wireless network, and wherein the devices include the computing device and the one or more HMDs;
send policies to the wireless access point for latency and resource unit requirements for sensor data from the one or more HMDs; and
utilize frame aggregation to aggregate packets to be sent to one or more HMDs via the wireless access point.

8. The CRM of claim 7, wherein the instructions are further to cause the VRS to instruct a WiFi subsystem to send unsolicited buffer status reports to the wireless access point to influence the wireless access point in managing wireless communication between the VRS and the one or more HMDs.

9. The CRM of claim 8, wherein the wireless access point is influenced to cause wireless communication between the VRS and the one or more HMDs to have a higher precedence over traffic from other devices in communication with the wireless access point.

10. The CRM of claim 9, wherein the instructions are further to cause the VRS to instruct the WiFi subsystem to include a traffic identifier, to influence provisioning of required resources by the wireless access point.

11. The CRM of claim 8, wherein the instructions are to cause the VRS to send the policies and instruct the WiFi subsystem to send the unsolicited buffer status reports to a virtual reality (VR) traffic handler in the wireless access point, for the VR traffic handler to influence a controller of the wireless access point in managing the wireless communication between the VRS and the one or more HMDs.

12. The CRM of claim 11, wherein the instructions are to further cause the VRS to instruct the WiFi subsystem to send to the wireless access point a bandwidth query report.

13. The CRM of claim 7, wherein the VRS communicates with the wireless access point through a WiFi driver of the computing device.

14. The CRM of claim 7, wherein the instructions are to further cause the VRS to use target wake time negotiations, to cause WiFi stations in communication with the wireless access point to operate at different times to minimize contention with resources required by the one or more HMDs.

15. A method, comprising:
requesting a wireless access point in communication with a virtual reality subsystem (VRS) and at least one virtual reality (VR) input or output (I/O) device to place the VRS and the at least one VR I/O device into at least one multi-user group, wherein the wireless access point manages wireless communication between devices of a wireless network, and wherein the devices include a computing device hosting the VRS and the at least one VR I/O device;
sending, by the VRS, policies to the wireless access point for latency and resource unit requirements for sensor data from the at least one VR I/O device; and
utilizing frame aggregation to aggregate packets to be sent from the VRS to the at least one VR I/O device in communication with the wireless access point.

16. The method of claim 15, further comprising requesting, by the VRS, a WiFi subsystem to send unsolicited buffer status reports to the wireless access point, the buffer status reports to have a higher precedence over traffic from other stations in communication with the wireless access point.

17. The method of claim 15, wherein the at least one multi-user group is a first multi-user group for carrying uplink traffic from the at least one VR I/O device to the access point, and is comprised of the VR I/O device and the wireless access point, and the method further comprises requesting the wireless access point place the at least one VR I/O device into a second multi-user group for downlink traffic from the access point to the at least one VR I/O device, place the computing device hosting the VRS and the wireless access point into a third multi-user group for uplink traffic from the computing device to the wireless access point, and place the wireless access point and the computing device into a fourth multi-user group for downlink traffic from the wireless access point to the computing device.

18. The method of claim 15, further comprising sending, by a WiFi subsystem, a bandwidth query report to the wireless access point.

19. The method of claim 15, further comprising using target wake time negotiations to cause stations in communication with the wireless access point to operate at different times to minimize contention with resources required by the at least one VR I/O device.

20. The method of claim 15, further comprising using a traffic ID to give the packets to be sent from the VRS to the at least one VR I/O device a higher priority over other traffic to the wireless access point.

21. A system, comprising:
virtual reality (VR) control means;
VR traffic handling means;
memory means to buffer traffic for the VR traffic handling means; and
at least one VR sensing means,
wherein the VR control means is to:
request the VR traffic handling means to place the at least one VR sensing means and the VR control means into a multi-user group, and
request the VR traffic handling means to allocate uplink resource units and latency guarantees for sensor data from the at least one VR sensing means.

22. The system of claim 21, wherein the VR control means is to send unsolicited buffer status reports to the VR traffic handling means to influence the VR traffic handling means in managing wireless communication between the VR control means and the at least one VR sensing means.

23. The system of claim 22, wherein the unsolicited buffer status reports are to have a higher precedence over traffic from other devices in communication with the VR traffic handling means.

24. The system of claim 22, wherein the VR control means is to further include a traffic identifier, to influence provisioning of required resources by the VR traffic handling means.

25. The wireless access point of claim 6, wherein sensor data from the HMD is identifie to the VRS by a traffic ID (TID).

* * * * *

UNITED STATES PATENT AND TRADEMARK OFFICE
CERTIFICATE OF CORRECTION

PATENT NO. : 10,620,697 B2
APPLICATION NO. : 16/144110
DATED : April 14, 2020
INVENTOR(S) : Karthik Veeramani et al.

Page 1 of 1

It is certified that error appears in the above-identified patent and that said Letters Patent is hereby corrected as shown below:

In the Claims

Column 19
Line 10, Claim 28 replace the word "identifie" after "HMD is" to "identified".

Signed and Sealed this
Eleventh Day of August, 2020

Andrei Iancu
*Director of the United States Patent and Trademark Office*